(12) United States Patent
Takeno

(10) Patent No.: US 9,805,357 B2
(45) Date of Patent: Oct. 31, 2017

(54) OBJECT RECOGNITION APPARATUS AND METHOD FOR MANAGING DATA USED FOR OBJECT RECOGNITION

(71) Applicant: TOSHIBA TEC KABUSHIKI KAISHA, Tokyo (JP)

(72) Inventor: Yuishi Takeno, Numazu Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/800,169

(22) Filed: Jul. 15, 2015

(65) Prior Publication Data

US 2016/0034882 A1    Feb. 4, 2016

(51) Int. Cl.
  G06Q 10/00 (2012.01)
  G06F 7/00 (2006.01)
  G06Q 20/20 (2012.01)
  G06Q 10/08 (2012.01)
  H04N 5/232 (2006.01)
  G06K 9/62 (2006.01)
  G06K 9/03 (2006.01)

(52) U.S. Cl.
  CPC ........... G06Q 20/208 (2013.01); G06K 9/033 (2013.01); G06K 9/6201 (2013.01); G06K 9/6254 (2013.01); G06Q 10/087 (2013.01); H04N 5/23229 (2013.01); G06K 2209/17 (2013.01)

(58) Field of Classification Search
  CPC ............................. G06Q 30/00; H04W 4/003
  USPC ............................................ 705/32; 709/226
  See application file for complete search history.

(56) References Cited

U.S. PATENT DOCUMENTS

| | | | | |
|---|---|---|---|---|
| 8,447,863 | B1 * | 5/2013 | Francis, Jr. | H04W 4/02 707/724 |
| 8,984,136 | B1 * | 3/2015 | Francis, Jr. | H04W 4/02 700/245 |
| 2002/0138336 | A1 * | 9/2002 | Bakes | G06Q 10/087 705/28 |
| 2003/0177069 | A1 * | 9/2003 | Joseph | G06Q 10/087 705/22 |
| 2003/0216969 | A1 * | 11/2003 | Bauer | G06K 7/0008 705/22 |
| 2005/0097005 | A1 * | 5/2005 | Fargo | G06Q 30/00 705/26.62 |
| 2005/0131578 | A1 * | 6/2005 | Weaver | G01G 19/4144 700/244 |

(Continued)

FOREIGN PATENT DOCUMENTS

JP    2014021921 A    2/2014

*Primary Examiner* — Seye Iwarere
(74) *Attorney, Agent, or Firm* — Patterson & Sheridan, LLP

(57) ABSTRACT

An apparatus for managing data used for object recognition includes an image capturing unit configured to capture an image of an object, a storage unit storing image data of products registered for sale, an operation panel configured to receive a user selection, and a processor configured to determine the products registered for sale that are similar to the object, based on the captured image and the image data, display the similar products on the operation panel as user selectable items, determine one or more of the similar products designated by the user selection, and invalidate the designated similar products so that efficiency of object recognition by the apparatus can be improved.

15 Claims, 11 Drawing Sheets

(56) References Cited

U.S. PATENT DOCUMENTS

| | | | |
|---|---|---|---|
| 2008/0077511 A1* | 3/2008 | Zimmerman | G06Q 10/00 705/28 |
| 2009/0059270 A1* | 3/2009 | Opalach | G06Q 10/087 358/1.15 |
| 2009/0063307 A1* | 3/2009 | Groenovelt | G06Q 10/087 705/28 |
| 2012/0016757 A1* | 1/2012 | Lee | G06Q 20/20 705/16 |
| 2012/0016780 A1* | 1/2012 | Lee | G06Q 10/087 705/28 |
| 2013/0083011 A1* | 4/2013 | Geisner | G09G 5/00 345/419 |
| 2014/0143039 A1* | 5/2014 | Branton | G06Q 30/0223 705/14.24 |
| 2014/0279747 A1* | 9/2014 | Strassner | G06N 99/005 706/12 |
| 2014/0280199 A1* | 9/2014 | Bare | G06T 19/006 707/743 |
| 2014/0304123 A1* | 10/2014 | Schwartz | G06Q 10/087 705/28 |
| 2015/0302027 A1* | 10/2015 | Wnuk | G06F 17/30268 382/305 |

* cited by examiner

| MERCHANDISE CODE | MERCHANDISE NAME | VALIDITY FLAG | SIMILARITY |
|---|---|---|---|
|  |  |  |  |
|  |  |  |  |
|  |  |  |  |
| ⋮ | ⋮ | ⋮ | ⋮ |

OBJECT RECOGNITION APPARATUS AND METHOD FOR MANAGING DATA USED FOR OBJECT RECOGNITION

CROSS-REFERENCE TO RELATED APPLICATION

This application is based upon and claims the benefit of priority from Japanese Patent Application No. 2014-155525, filed Jul. 30, 2014, the entire contents of which are incorporated herein by reference.

FIELD

Embodiments described herein relate generally to an object recognition apparatus and method for managing data used for object recognition.

BACKGROUND

Object recognition technology enables an object included in an image captured by a CCD camera or the like to be identified. An object recognition apparatus of one type that uses such a technology extracts an image region that contains an object from a captured image. Then, the object recognition apparatus analyzes the extracted image region and calculates feature values of the object such as a hue and a pattern. The object recognition apparatus then compares the feature values of the object with feature values of various articles registered in a storage unit and calculates the similarity of the object and the registered articles. The object recognition apparatus determines that an article with feature values having the highest similarity to the feature values of the object is the object.

Such an object recognition technology can be applied to a store accounting system (POS system), in order to identify a product to be purchased. When there are several products registered for sale that are similar to a product to be purchased, the efficiency of a process to identify the product may decrease because the apparatus or the user thereof needs to determine the product to be purchased from many candidates. In addition, a store may not sell all of the similar products that are registered for sale. It would be desirable to decrease the number of candidates as much as possible to efficiently identify the product to be purchased.

DETAILED DESCRIPTION

An embodiment provides an apparatus for managing data used for object recognition that may efficiently invalidate image data of a product registered for sale.

In general, according to an embodiment, an apparatus for managing data used for object recognition includes an image capturing unit configured to capture an image of an object, a storage unit storing image data of products registered for sale, an operation panel configured to receive a user selection, and a processor configured to determine the products registered for sale that are similar to the object, based on the captured image and the image data, display the similar products on the operation panel as user selectable items, determine one or more of the similar products designated by the user selection, and invalidate the designated similar products so that efficiency of object recognition by the apparatus can be improved.

Hereinafter, embodiments of a data managing apparatus for object recognition will be described with reference to the drawings.

In the embodiments below, the data managing apparatus manages, as an example, a dictionary file of merchandise data used to identify merchandise in an image captured by a reading apparatus using the technology of object recognition.

First Embodiment

Figure 1:
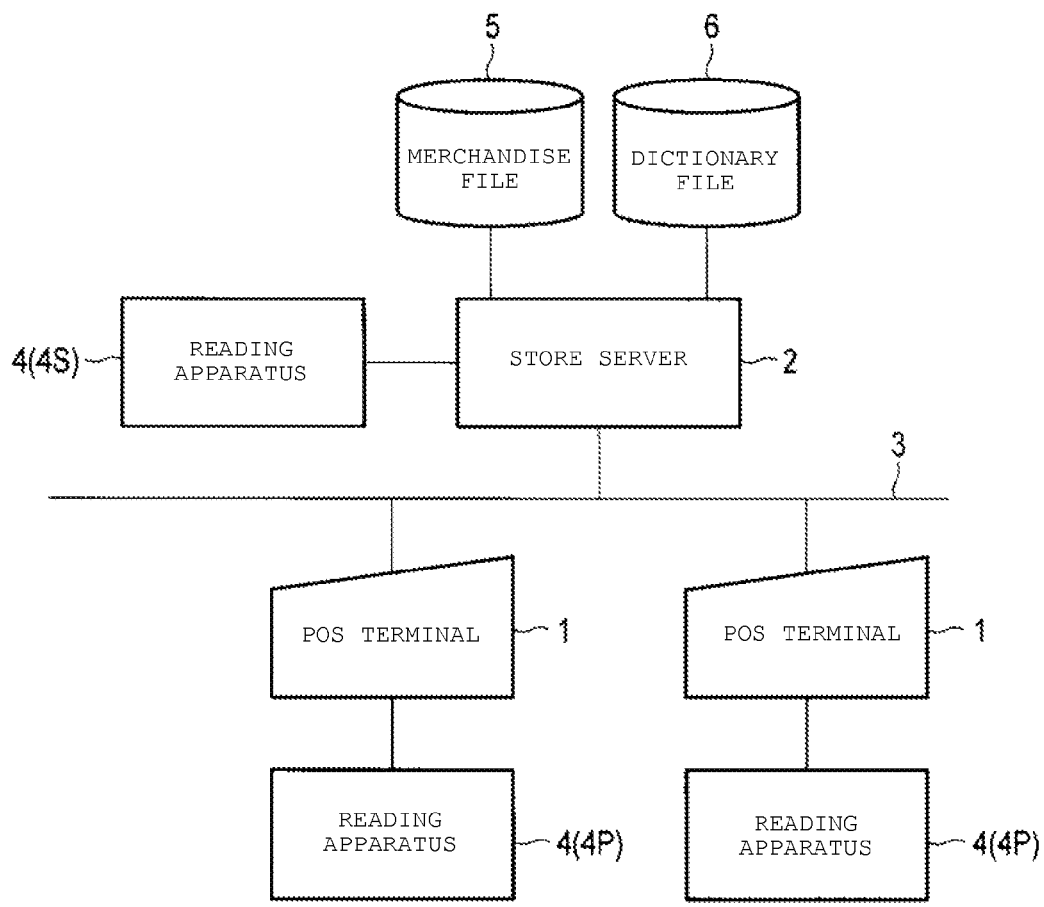
FIG. 1 is a block diagram of a store checkout system according to a first embodiment.

FIG. 1 is a block diagram of a store checkout system that includes a merchandise reading apparatus 4 (4P and 4S). The store checkout system includes multiple POS terminals 1 and a store server 2, which is a host controller of each POS terminal 1. Each POS terminal 1 and the store server 2 can communicate with each other through a network 3 such as a local area network (LAN). A merchandise reading apparatus 4P is connected to each POS terminal 1. A merchandise reading apparatus 4S is connected to the store server 2. The merchandise reading apparatuses 4P and 4S are the same type, and both can recognize merchandise using the technology of the object recognition. Hereinafter, the merchandise reading apparatus 4P and the merchandise reading apparatus 4S will be collectively described as the merchandise reading apparatus 4.

The store server 2 includes a merchandise file 5 so as to support merchandise sales and registration operation by each POS terminal 1. In addition, the store server 2 includes a dictionary file 6 so as to support merchandise identification operation by each merchandise reading apparatus 4 (4P and 4S). The merchandise file 5 and the dictionary file 6 may be stored in a storage device incorporated into the store server 2 or may be stored in a storage device externally attached to the store server 2. Alternatively, one of the merchandise file 5 and the dictionary file 6 may be stored in an incorporated storage device, and the other may be stored in an externally attached storage device.

Figure 2:
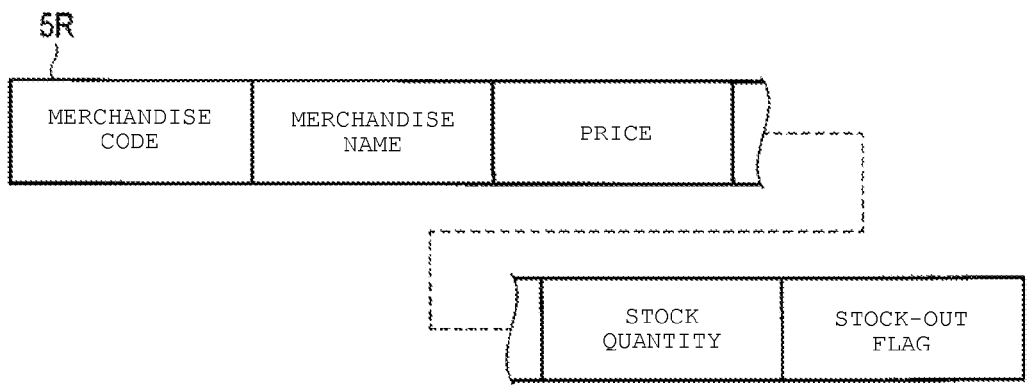
FIG. 2 illustrates a data structure of a record included in a merchandise file stored in a store server of the store checkout system.

The merchandise file 5 includes data related to each merchandise item. The data is stored in the merchandise file 5 as one record per one merchandise item. FIG. 2 schematically illustrates a data structure of a record 5R stored in the merchandise file 5. As illustrated in FIG. 2, the record 5R includes data fields for merchandise code, merchandise name, price, stock quantity (inventory quantity), and stock-out flag for each of merchandise items. The merchandise code is a code that is used to identify each merchandise item. The merchandise name, the price, and the stock quantity are merchandise-specific information stored in association with the corresponding merchandise code. The stock-out flag is set as "1" when the corresponding merchandise item is out of stock. The stock-out flag may be set as "0" when the corresponding merchandise item is out of stock.

Figure 3:
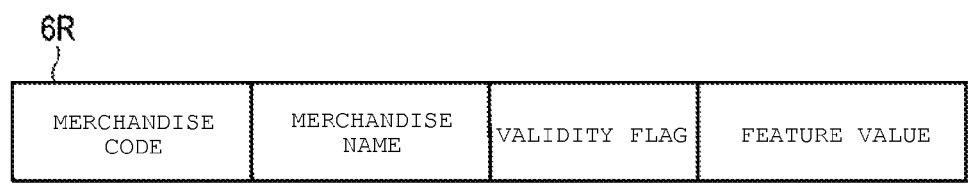
FIG. 3 illustrates a data structure of a record included in a dictionary file stored in the store server.

The dictionary file 6 stores feature values of merchandise items registered for sale. The merchandise items include, for example greengrocery such as fruits and vegetables. The feature values are stored in the dictionary file 6 as one record per one merchandise item. FIG. 3 schematically illustrates a data structure of a record 6R stored in the dictionary file 6. As illustrated in FIG. 3, the dictionary file 6 stores the record 6R that includes data fields for merchandise code, merchandise name, validity flag, and feature value for a merchandise item. The feature value represents standard features of the exterior of a merchandise item, such as a shape, a hue of a surface, a texture, and a roughness of the merchandise item, and is parameterized data. Three-dimensional external features of a merchandise item are different depending on the direction in which the image of the item is captured by a camera. The record 6R includes multiple feature values that are respectively calculated from multiple reference images of the item taken at different angles. The validity flag is set as "1" when the corresponding feature value is valid and is set as "0" when the corresponding feature value is invalid. Alternatively, the validity flag may be set as "0" when the corresponding feature value is valid and as "1" when the corresponding feature value is invalid.

Figure 4:
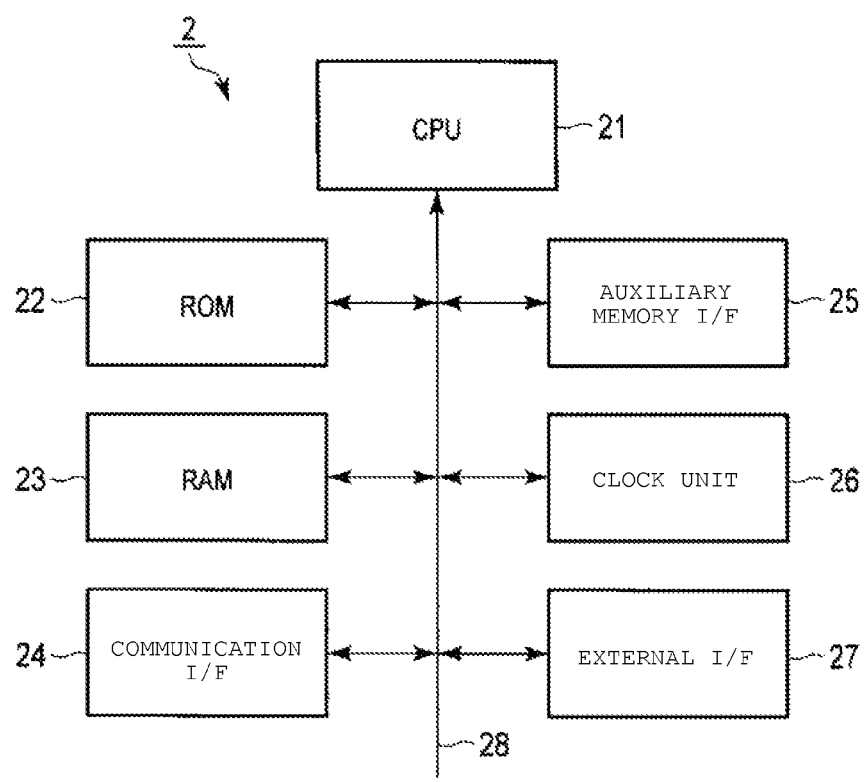
FIG. 4 is a block diagram of the store server.

FIG. 4 is a block diagram of the store server 2. The store server 2 includes a central processing unit (CPU) 21, a read-only memory (ROM) 22, a random access memory (RAM) 23, a communication interface 24, an auxiliary memory interface 25, a clock unit 26, an external interface 27, and the like. In addition, the store server 2 includes a bus line 28 that includes an address bus and a data bus. The CPU 21, the ROM 22, the RAM 23, the communication interface 24, the auxiliary memory interface 25, the clock unit 26, and the external interface 27 are connected to the bus line 28.

The CPU 21 corresponds to a core of a computer configuring the store server 2. The CPU 21 controls each unit according to an operating system and an application program so as to perform various functions of the store server 2.

The ROM 22 corresponds to a main memory of the computer. The ROM 22 stores the operating system and the application program. The ROM 22 may store data that is necessary for the CPU 21 to control each unit.

The RAM 23 also corresponds to the main memory of the computer. The RAM 23 stores data that is necessary for the CPU 21 to perform processes. The RAM 23 is also used as a work area in which information is appropriately rewritten by the CPU 21.

The communication interface 24 connects the store server 2 to the network 3 and communicates data with each POS terminal 1 connected through the network 3.

The auxiliary memory interface 25 connects an auxiliary memory device (not illustrated) to the store server 2 and reads data from and writes data to the device. The auxiliary memory device corresponds to an auxiliary memory of the computer. The auxiliary memory device is, for example, an electrically erasable programmable read-only memory (EEPROM), a hard disk drive (HDD), or a solid state drive (SSD). The auxiliary memory device stores data that is used in various processes performed by the CPU 21 and data generated through the processes performed by the CPU 21. The auxiliary memory device may store the application program. The auxiliary memory device may also store the merchandise file 5 and the dictionary file 6.

The clock unit 26 tracks the current date and time.

The external interface 27 communicates with an external device such as the merchandise reading apparatus 4S connected to the store server 2 in a detachable manner. The external interface 27 receives data output from the external device and outputs data to the external device.

The CPU 21 of the store server 2 selects the data record 6R indicating a valid state of the validity flag from the dictionary file 6 and creates a local file of the dictionary file 6 when, for example, the time tracked by the clock unit 26 reaches a preset time. Then, the CPU 21 delivers the local file of the dictionary file 6 to each POS terminal 1 through the network 3. Each POS terminal 1 stores the local file in the auxiliary memory device such as an HDD.

The delivery timing of the local file of the dictionary file 6 by the CPU 21 of the store server 2 to each POS terminal 1 is not limited to the time described above. For example, each time the data of the dictionary file 6 is updated, the CPU 21 may create the local file of the dictionary file 6 and deliver the local file to each POS terminal 1.

Figure 5:
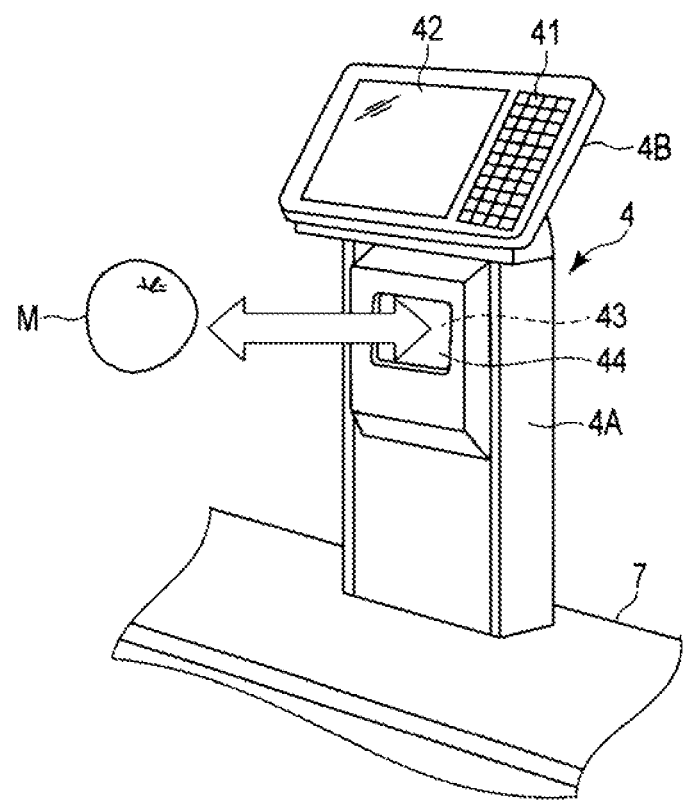
FIG. 5 is a perspective view of a merchandise reading apparatus in the store checkout system.
Figures 6, 7:
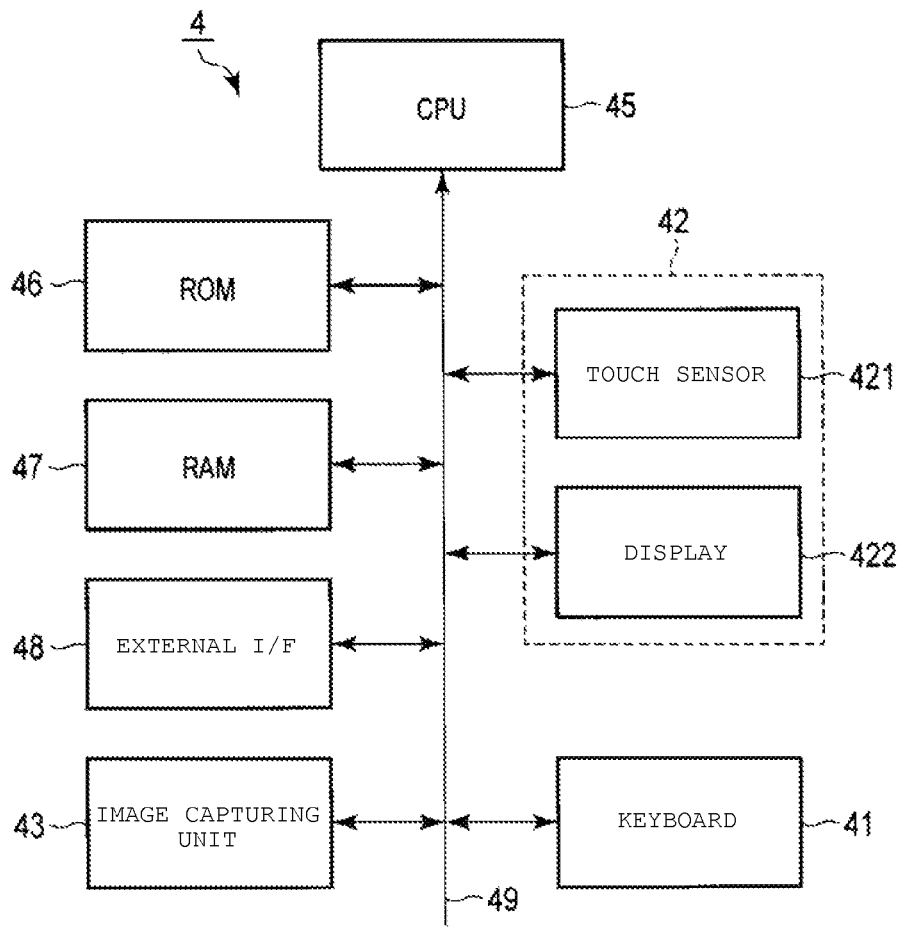
FIG. 6 is a block diagram of the merchandise reading apparatus.
FIG. 7 illustrates a data structure of a dictionary management buffer stored in a memory unit of the merchandise reading apparatus.

FIG. 5 is a perspective view of the merchandise reading apparatus 4. FIG. 6 is a block diagram of the merchandise reading apparatus 4. As illustrated in FIG. 5, the merchandise reading apparatus 4 includes a rectangular parallelepiped housing 4A. The housing 4A stands on a table 7 such as a checkout counter in the longitudinal direction of the housing 4A as the axis of standing. An operating panel 4B that includes a keyboard 41 and a touch panel 42 is disposed in the top portion of the housing 4A. The operating panel 4B is directed toward a casher (operator) so that an operating face is substantially aligned with one side face of the housing 4A (hereinafter, front face).

An image capturing unit 43 is mounted in the housing 4A. A rectangular reading window 44 is formed on the front face of the housing 4A. The image capturing unit 43 includes a charge coupled device (CCD) image capturing element, which is an area image sensor, a drive circuit for the CCD image capturing element, and an image capturing lens that is used to form an image of an image capture area on the CCD image capturing element. The image capture area is an area in a frame in which image is formed on the CCD image capturing element through the reading window 44 and the image capturing lens. Then, the image capturing unit 43 outputs mage data of the image in the image capture area that is formed on the CCD image capturing element through the image capturing lens. The image capturing unit 43 is not limited to the area image sensor that uses the CCD image capturing element. For example, the image capturing unit 43 may be a complementary metal oxide semiconductor (CMOS) image sensor.

The merchandise reading apparatus 4, as illustrated in FIG. 6, includes a CPU 45, a ROM 46, a RAM 47, and an external interface 48 in addition to the keyboard 41, the touch panel 42, and the image capturing unit 43.

The CPU 45 corresponds to a core of a computer configuring the merchandise reading apparatus 4. The CPU 45 is connected to each unit such as the ROM 46, the RAM 47, the external interface 48, the keyboard 41, a touch sensor 421 of the touch panel 42, a display 422 of the touch panel 42, and the image capturing unit 43 through a bus line 49, which includes an address bus and a data bus. The CPU 45 controls each unit according to an operating system and an application program so as to perform various functions of the merchandise reading apparatus 4.

The ROM 46 corresponds to a main memory of the computer. The ROM 46 stores the operating system and the application program. The ROM 46 may store data that is necessary for the CPU 45 to control each unit.

The RAM 47 also corresponds to the main memory of the computer. The RAM 47 stores data that is necessary for the CPU 45 to perform processes. The RAM 47 is also used as a work area in which information is appropriately rewritten by the CPU 45.

The external interface 48 communicates with an external device such as the POS terminal 1 or the store server 2 connected to the merchandise reading apparatus 4 in a detachable manner. The external interface 48 receives data that is output from the external device and outputs data to the external device.

The merchandise reading apparatus 4P connected to the POS terminal 1 and the merchandise reading apparatus 4S connected to the store server 2 have the same hardware but have different software.

The merchandise reading apparatus 4P, when an image of a merchandise item M held near the reading window 44 is captured by the image capturing unit 43, extracts a feature value representing attributes of the merchandise item M, such as the hue and the texture from the image of the merchandise item M. The merchandise reading apparatus 4P calculates similarity between the extracted feature value and feature values of valid merchandise items registered in the local file of the dictionary file 6 with respect to each merchandise item.

The merchandise reading apparatus 4P determines one or more merchandise items of which the similarity exceeds a predetermined threshold as merchandise items similar to the merchandise item M held near the reading window 44. Then, the merchandise reading apparatus 4P displays a list of the similar merchandise items on the touch panel 42.

The merchandise reading apparatus 4P, when one merchandise item is selected from the list by a touch operation performed on the touch panel 42, determines that the selected merchandise item is the merchandise item M held near the reading window 44 and outputs the merchandise code of the merchandise item to the POS terminal 1. The POS terminal 1 obtains merchandise information such as the price of the merchandise item M by searching the merchandise file 5 using the merchandise code received from the merchandise reading apparatus 4P, as a search key, and registers merchandise sales data based on the merchandise information.

The merchandise reading apparatus 4P includes an application program that is used for the CPU 21 to perform the above processes (hereinafter, merchandise recognition program) in the ROM 46 or the RAM 47.

The merchandise reading apparatus 4S, when the image of the merchandise item M held near the reading window 44 is captured by the image capturing unit 43, extracts the feature value representing attributes of the merchandise item M, such as the hue and the texture from the image of the merchandise item M. The merchandise reading apparatus 4S calculates similarity between the extracted feature value and feature values of valid merchandise items registered in the dictionary file 6 with respect to each merchandise item.

The merchandise reading apparatus 4S determines one or more merchandise items of which the similarity exceeds a predetermined threshold as merchandise items similar to the merchandise item M held near the reading window 44. The merchandise reading apparatus 4S displays a list of the similar merchandise items on the touch panel 42. The processes are so far the same as those of the merchandise reading apparatus 4P.

The merchandise reading apparatus 4S, when one merchandise item is selected from the list by a touch operation performed on the touch panel 42, sets the validity flag that is correlated with the feature value of the selected merchandise item. That is, the merchandise reading apparatus 4S sets the validity flag as "0" when the validity flag is currently "1" and sets the validity flag as "1" when the validity flag is currently "0".

The merchandise reading apparatus 4S instructs the store server 2 to update the dictionary file 6 when the selection from the list by a touch operation is performed on the touch panel 42. The store server 2 updates the dictionary file 6 according to the instruction. The merchandise reading apparatus 4S functions as a data managing apparatus for object recognition that manages the dictionary file 6.

The merchandise reading apparatus 4S includes an application program that is used for the CPU 21 to perform the processes related to the above functions of the merchandise reading apparatus 4S (hereinafter, dictionary management program) in the ROM 46 or the RAM 47. In addition, the merchandise reading apparatus 4S generates a dictionary management buffer 471 having the data structure illustrated in FIG. 7 in the RAM 47 as a memory region that is necessary in performing processes according to the dictionary management program. The dictionary management buffer 471 includes a memory region that is used to store each data field of the merchandise code, the merchandise name, the validity flag, and the similarity illustrated in FIG. 7.

Figure 8:
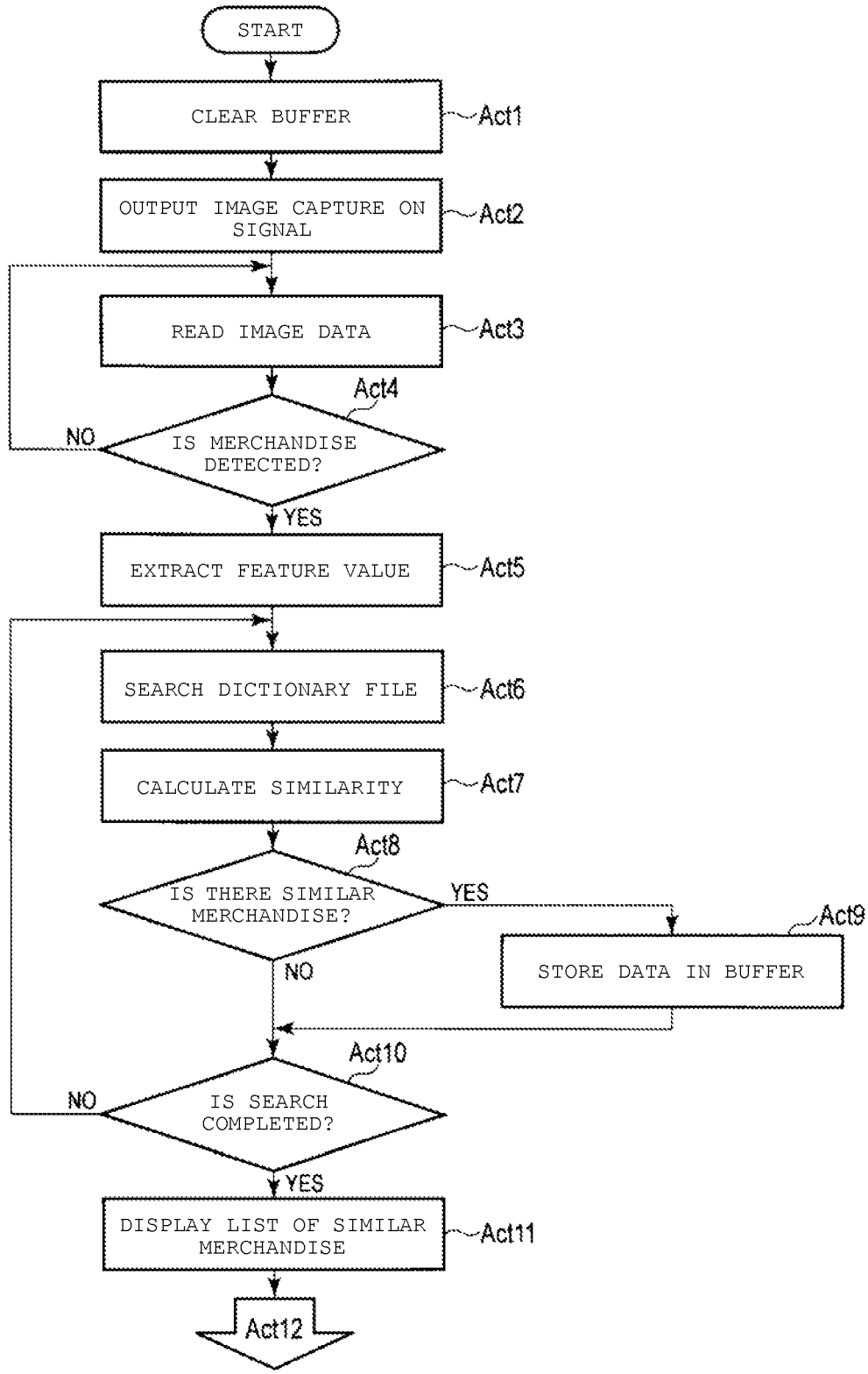
FIGS. 8 and 9 are each a flowchart illustrating information processing performed by a CPU of the merchandise reading apparatus according to a dictionary management program in the first embodiment.
Figure 9:
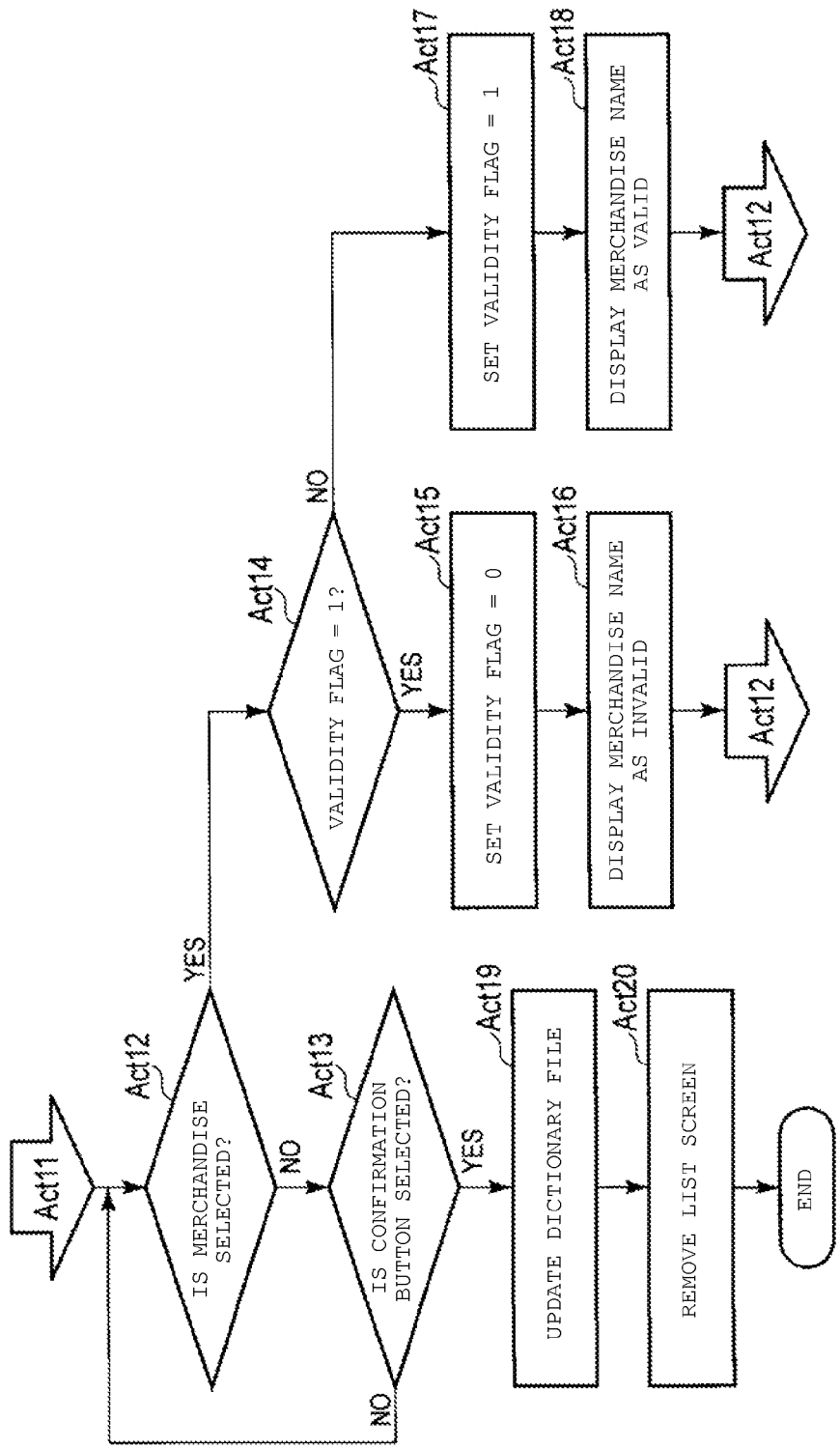

FIG. 8 and FIG. 9 are flowcharts illustrating information processing that the CPU 45 of the merchandise reading apparatus 4S performs according to the dictionary management program. The dictionary management program is launched when a dictionary management operation is selected from a menu including various operations performable by the merchandise reading apparatus 4S. Hereinafter, the operation of the merchandise reading apparatus 4S will be described with reference to FIG. 8 and FIG. 9. The processes illustrated in FIG. 8 and FIG. 9 and described hereinafter are for illustrative purposes only. Various processes that may achieve the same effect may be appropriately used.

The CPU 45 first clears the buffer 471 when the dictionary management program is launched (Act 1). Next, the CPU 45 outputs an image capture ON signal to the image capturing unit (Act 2). The image capture ON signal causes the image capturing unit 43 to start capturing a frame image in the image capture area. Data of the frame image in the image capture area captured by the image capturing unit 43 is sequentially stored in a frame memory of the RAM 47.

The CPU 45 obtains the data of the frame image stored in the frame memory (Act 3). The CPU 45 checks whether the merchandise item M is detected from the frame image (Act 4). Specifically, the CPU 45 operates to extract contours of an object detected in the frame image based on the contrast and the like of a binary image converted from the frame image. When the contours of the object are extracted, the CPU 45 determines that the image within the contours is the merchandise item M.

The CPU 45 obtains data of the next frame image from the frame memory (Act 3) when the merchandise item M is not detected based on the frame image (NO in Act 4). The CPU 45 determines whether the merchandise item M is detected based on one or more frame images (Act 4).

When the CPU 45 (specifying section) detects the merchandise item M based on the frame image (YES in Act 4), the CPU 45 (extracting section) extracts the feature value representing the exterior (exterior features), such as the shape, the hue of the surface, the texture, and the roughness of the merchandise item M from the image within the contours (Act 5). The extracted feature value is stored in a work memory of the RAM 47.

The CPU 45, when the extraction of the feature value of the merchandise item M is completed, instructs the store server 2 to search the dictionary file 6 and obtains the data record (merchandise code, merchandise name, validity flag, and feature value) 6R of one merchandise item from the dictionary file 6 (Act 6). Then, the CPU 45 calculates the similarity between the extracted feature value and the feature value of the record 6R (Act 7). The similarity becomes higher as a value becomes greater. In the present embodiment, the similarity is calculated with an upper limit of "100". When the similarity is calculated, the CPU 45 (evaluating section) determines whether the merchandise item is a similar merchandise item by comparing the value of the similarity with a predetermined threshold (for example, 60) (Act 8).

The CPU 45, when the similarity exceeds the threshold, recognizes the merchandise item having the merchandise code in the data record 6R as a merchandise item similar to the merchandise item M. When the merchandise item is recognized as the similar merchandise item (YES in Act 8), the CPU 45 writes the merchandise code, the merchandise name, and the validity flag of the data record 6R together with the similarity calculated in Act 7 in the dictionary management buffer 471 (Act 9). When the similarity does not exceed the threshold, and the merchandise item is recognized as a dissimilar merchandise item (NO in Act 8), the CPU 45 does not perform Act 9.

Then, the CPU 45 determines whether the search in the dictionary file 6 is completed (Act 10). The CPU 45 returns to Act 6 when the data record 6R that is obtained from the dictionary file 6 is not the last record of the dictionary file 6, and the search is determined to be not completed (NO in Act 10).

That is, the CPU 45 sequentially obtains the data record 6R from the dictionary file 6. Each time the CPU 45 obtains the data record 6R, the CPU 45 calculates the similarity between the extracted feature value and the feature value in the obtained data record 6R. When the similarity exceeds the threshold, the CPU 45 repeats writing the merchandise code, the merchandise name, and the validity flag of the data record 6R together with the similarity in the dictionary management buffer 471.

The CPU 45 (notifying section), when the search in the dictionary file 6 is completed (YES in Act 10), creates a list screen 8 of similar merchandise items (refer to FIG. 10) based on the data stored in the dictionary management buffer 471 (Act 11). The CPU 45 operates to display the list screen 8 on the touch panel 42.

Figure 10:
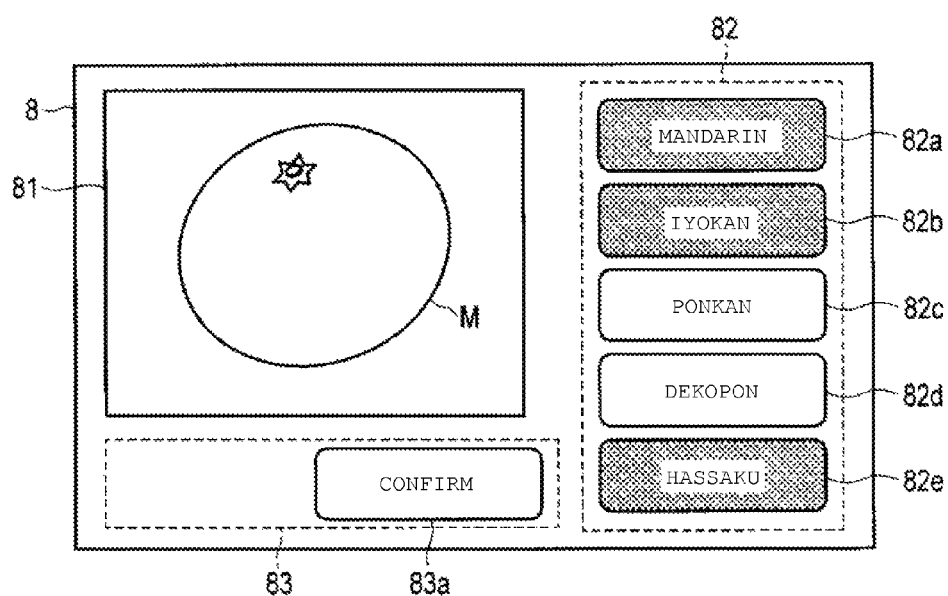
FIG. 10 illustrates an example of a list screen displayed on a touch panel of the merchandise reading apparatus according to the first embodiment.

An example of the list screen 8 is illustrated in FIG. 10. The list screen 8 includes an image area 81, a merchandise area 82, and a function area 83. The image of the merchandise item M captured in Act 4 is displayed in the image area 81. Multiple (five in FIG. 10) merchandise buttons 82a to 82e are displayed in the merchandise area 82 from the top of the screen 8 to the bottom. A confirm button 83a is displayed in the function area 83 to declare confirmation.

Each merchandise name stored in the dictionary management buffer 471 is displayed in each of the merchandise buttons 82a to 82e, respectively, in order of greatest similarity from the top of the screen. For a merchandise item of which the validity flag is reset as "0" (invalid merchandise item), the luminance of the merchandise button displayed is low so as to be distinguished from a merchandise item of which the validity flag is set as "1" (valid merchandise item).

The number of merchandise buttons 82a to 82e is not limited to five. When four or less merchandise names are stored in the dictionary management buffer 471, only the corresponding number of merchandise buttons may be displayed. In contrast, when six or more merchandise names are stored in the dictionary management buffer 471, a next button may be displayed in the function area 83, and the sixth and later merchandise buttons may be displayed in the area 82 when the next button is selected.

A method for distinguishing a valid merchandise item and an invalid merchandise item is not limited to the luminance of the merchandise buttons. For example, one may be distinguished from the other by inverting black and white on one merchandise name. Alternatively, one may be distinguished from the other by changing the background color of the merchandise buttons 82a to 82e. The point is that any method may be used provided that an operator may identify a valid merchandise item and an invalid merchandise item at a glance.

The list screen 8 illustrated in FIG. 10 is displayed on the touch panel 42, for example, when the operator holds a "mandarin" (citrus A) near the reading window 44 so as to add the feature value of the "mandarin" to the dictionary file 6. From the list screen 8, the operator knows that the "mandarin" held near the reading window 44 is recognized to be similar to merchandise items (merchandise items having similarity greater than or equal to the threshold), such as "mandarin", "iyokan" (citrus B), "ponkan" (citrus C), "dekopon" (citrus D), and "hassaku" (citrus E). The operator can recognize that among these similar merchandise items, "mandarin", "iyokan", and "hassaku" of which the luminance of the merchandise names is low are invalid (validity flag "0"), and "ponkan" and that "dekopon" of which the luminance of the merchandise names is high are valid (validity flag "1").

The operator touches the merchandise button 82a of "mandarin" when validating "mandarin". The operator touches the merchandise button 82c of "ponkan" to invalidate "ponkan" when, for example, a sales period of "ponkan" is over. The operator touches the confirm button 83a when the operator finishes switching between validation and invalidation of a merchandise item.

The CPU 45 (receiving section), when the list screen 8 of similar merchandise items is displayed, determines whether or not one of the merchandise buttons 82a to 82e is selected (Act 12). Further, if it is determined that one of the merchandise buttons 82a to 82e are selected (NO in Act 12), the CPU 45 determines whether or not the confirm button 83a illustrated in FIG. 9 is operated (Acts 13). When one of the merchandise buttons 82a to 82e is input (YES in Act 12), the CPU 45 determines that the merchandise item having the merchandise name displayed in the input one of the merchandise buttons 82a to 82e is selected. Then, the CPU 45 refers to the dictionary management buffer 471 and determines the validity flag of the selected merchandise item (Act 14).

The CPU 45 (invalidating section), when the validity flag is set as "1" (YES in Act 14), sets the validity flag of the selected merchandise item stored in the dictionary management buffer 471 as "0" (Act 15). In addition, the CPU 45 switches the merchandise name of the selected merchandise item displayed in one of the merchandise buttons 82a to 82e from a valid merchandise display form to an invalid merchandise display form (Act 16). Thereafter, the process returns to Act 12.

The CPU 45 (validating section), when the validity flag is set as "0" (NO in Act 14), sets the validity flag of the selected merchandise item stored in the dictionary management buffer 471 as "1" (Act 17). In addition, the CPU 45 switches the merchandise name of the selected merchandise item displayed in one of the merchandise buttons 82a to 82e from an invalid merchandise display form to a valid merchandise display form (Act 18). Thereafter, the process returns to Act 12.

The CPU 45, when the confirm button 83a is selected (YES in Act 13), outputs data stored in the dictionary management buffer 471 to the store server 2 and instructs the store server 2 to update the dictionary file 6 (Act 19). The CPU 45 removes the list screen 8 of similar merchandise items (Act 20). The CPU 45 completes the information processing that is performed according to the dictionary management program.

The order of Act 15 and Act 16, the order of Act 17 and Act 18, and the order of Act 19 and Act 20 may be replaced with each other, respectively.

The CPU 21 of the store server 2 that is instructed to update the dictionary file 6 accesses the dictionary file 6. The CPU 21 updates the validity flag of the merchandise item (similar merchandise item) so that the validity flag matches the data in the dictionary management buffer 471, that is received from the merchandise reading apparatus 4S.

According to the first embodiment, the operator of the merchandise reading apparatus 4S may perceive whether the data of a merchandise item held near the reading window 44 and/or the data of a merchandise item in the dictionary file 6 similar to that merchandise item is valid or invalid from the information displayed on the list screen 8 including the similar merchandise items.

The operator, when, for example, there is a merchandise item among similar merchandise items that is to be invalidated because the sales period is over, can touch one of the merchandise buttons 82a to 82e in each of which the merchandise name of the merchandise item is displayed. Simply by the operator touching the button, the merchandise reading apparatus 4 may invalidate the record of the dictionary file 6 that includes the feature value of the merchandise item. Conversely, when, for example, there is a merchandise item that is to be validated so as to be sold again, the operator can touch one of the merchandise buttons 82a to 82e in which the merchandise name of the merchandise item is displayed. Simply by the operator touching the button, the merchandise reading apparatus 4 may validate the record of the dictionary file 6 that includes the feature value of the merchandise item.

The merchandise reading apparatus 4S, therefore, may simply invalidate feature value of a similar merchandise item that should be excluded from feature values registered in the dictionary file 6, which are referred to during the merchandise recognition process. In addition, the merchandise reading apparatus 4S may validate feature value with a simple operation when the feature value of a similar merchandise item that should be included in the feature values referred to during the merchandise recognition process. As a result, a merchandise item may be efficiently identified when there are many merchandise items similar to the merchandise item.

Second Embodiment

Next, a second embodiment will be described. The components common to the first embodiment are described with the same reference numerals and will not be described in detail.

In the first embodiment, the merchandise reading apparatus 4S that is connected to the store server 2 functions as the data managing apparatus for object recognition. In the second embodiment, the merchandise reading apparatus 4P that is connected to the POS terminal 1 functions as the data managing apparatus for object recognition. In order to do so, the management program for the dictionary file 6 is incorporated into the merchandise recognition program that is stored in the merchandise reading apparatus 4P.

Figure 11:
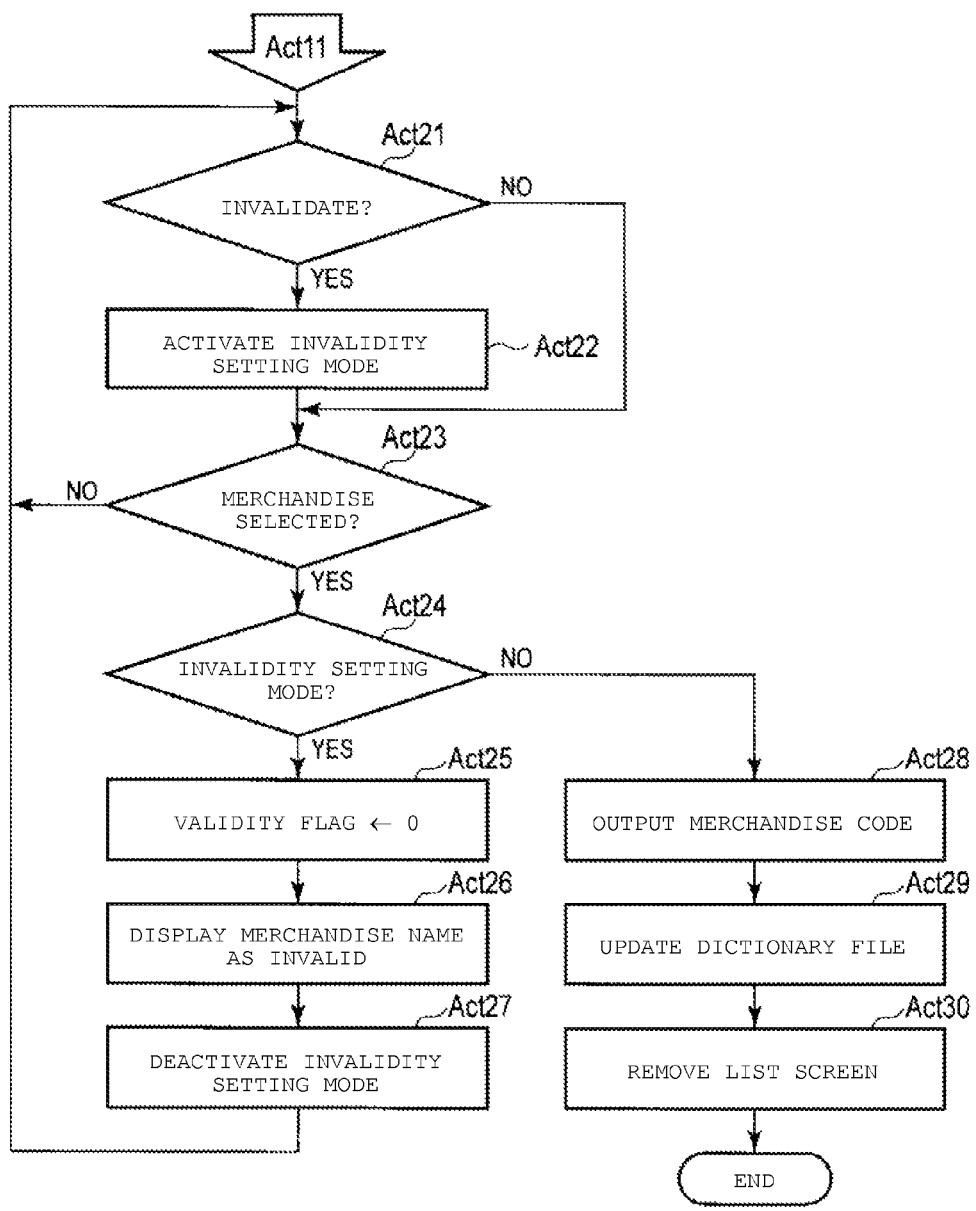
FIG. 11 is a flowchart illustrating information processing performed by the CPU of the merchandise reading apparatus according to the dictionary management program in a second embodiment.
Figure 12:
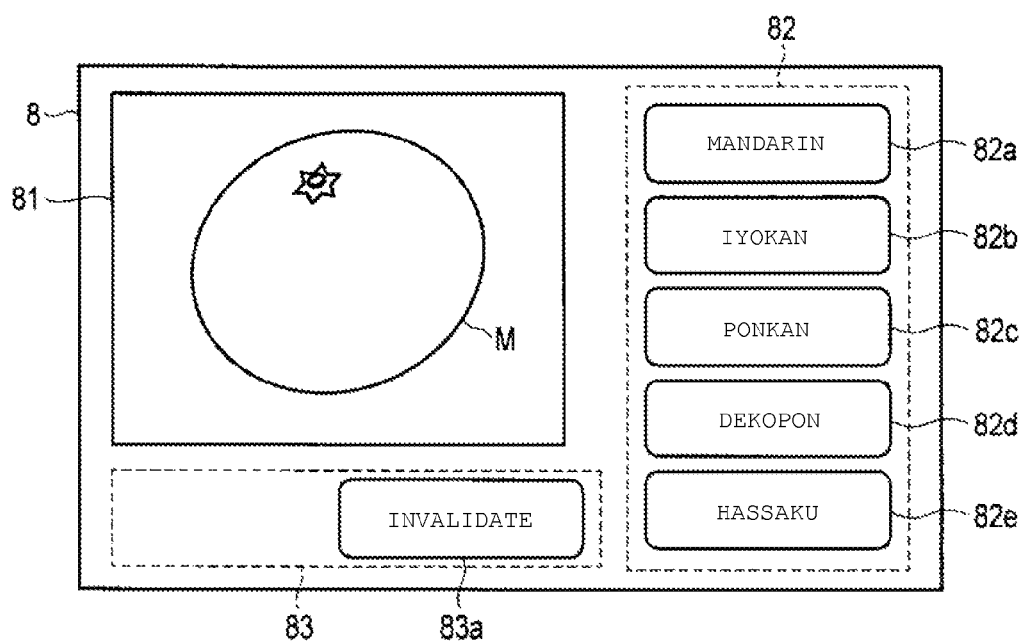
FIG. 12 illustrates an example of a list screen displayed on the touch panel of the merchandise reading apparatus according to the second embodiment.

FIG. 11 is a flowchart illustrating information processing that the CPU 45 of the merchandise reading apparatus 4P performs according to the merchandise recognition program into which the management program for the dictionary file 6 is incorporated. In the processing, Act 1 to Act 11 are basically the same as those carried out by the merchandise reading apparatus 4S illustrated in FIG. 8. However, in Act 6, the merchandise reading apparatus 4P searches the local file of the dictionary file 6 that is delivered to each POS terminal 1. Therefore, all of the merchandise buttons 82a to 82e displayed in the merchandise area 82 of the list screen 8 of similar merchandise items are valid as illustrated in FIG. 12. In addition, an invalidate button 83b is displayed in the function area 83 to declare invalidation of one or more merchandise items.

The operator can recognize that the "mandarin" held near the reading window 44 is similar to merchandise items (merchandise items having the similarity greater than or equal to the threshold), such as "mandarin", "iyokan", "ponkan", "dekopon", and "hassaku" when the list screen 8 in FIG. 12 is displayed on the touch panel 42. The operator can also recognize that all of these similar merchandise items are valid (the validity flag "1").

The operator touches the invalidate button 83a and thereafter, touches the merchandise button 82c of "ponkan" to invalidate "ponkan" when, for example, the sales period for "ponkan" is over. The operator touches the merchandise button 82a of "mandarin" to register "mandarin" for sale.

When Act 11 is completed, the CPU 45 determines whether or not the invalidate button 83b is operated (Act 21)). When the invalidate button 83b is input (YES in Act 21), the CPU 45 activate invalidity setting mode (Act 22). Thereafter, the CPU 45 determines whether or not one of the merchandise buttons 82a to 82e is operated (Act 23).

The CPU 45, when one of the merchandise buttons 82a to 82e is operated (YES in Act 23), determines whether or not the invalidity setting mode is activated (Act 24). When the invalidity setting mode is activated (YES in Act 24), the CPU 45 operates to invalidate the merchandise item having the merchandise name displayed in the selected one of the merchandise buttons 82a to 82e. Specifically, the CPU 45 refers to the dictionary management buffer 471 and sets the validity flag of the selected merchandise item as "0" (Act 26). In addition, the CPU 45 switches the merchandise button of the selected merchandise item displayed from a valid merchandise display form to an invalid merchandise display form (Act 26). The CPU 45 deactivates the invalidity setting mode (Act 27). Thereafter, the process returns to Act 21.

The order of Acts 25, 26, and 27 is not limited to the one described above. The order of Acts 25, 26, and 27 may be changed.

The CPU 45, when the invalidity setting mode is not activated (NO in Act 24), that is, when one of the merchandise buttons 82a to 82e is selected without the input of the invalidate button 83b, recognizes that the selected merchandise item is the merchandise item held near the reading window 44. The CPU 45 reads the merchandise code of the merchandise item from the dictionary management buffer 471 and outputs the merchandise code to the POS terminal 1 through the external interface 48 (Act 28). The CPU 45 outputs the data stored in the dictionary management buffer 471 to the store server 2 via the POS terminal 1 and instructs the store server 2 to update the dictionary file 6 (Act 29). The CPU 45 removes the list screen 8 of similar merchandise items (Act 30). The CPU 45 completes the information processing that is performed according to the merchandise recognition program.

According to the second embodiment, the merchandise reading apparatus 4P that is connected to the POS terminal 1 may be used to invalidate the record 6R that includes unnecessary feature value among the feature values of merchandise items registered in the dictionary file 6. Therefore, when a cashier notices a merchandise item that is not currently sold among the merchandise items displayed as similar merchandise items on the list screen 8, the cashier may invalidate the record 6R of the dictionary file 6 that includes the feature value of the merchandise item.

The merchandise reading apparatus 4S described in the first embodiment may be used in the second embodiment when the invalidated record of the similar merchandise item is to be validated again.

Third Embodiment (Reference Example)

The record 6R that is to be invalidated from the dictionary file 6 is, for example, a record that includes the feature value of a non-saleable merchandise item. When a non-saleable merchandise item is automatically specified, a record that includes the feature value of the merchandise item may be automatically invalidated. Similarly, when a merchandise item that is switched from a non-saleable state to a saleable state is automatically specified, a record that includes the feature value of the merchandise item may be automatically validated.

The merchandise file 5 includes stock quantity data with respect to each merchandise item. When the stock quantity is "0", the merchandise item is non-saleable (out of stock). When the stock quantity is increased from "0", the merchandise item is saleable.

In the third embodiment, the store server 2 determines whether a merchandise item is a non-saleable merchandise item or a saleable merchandise item based on the stock quantity, automatically invalidates a record that includes the feature value of the non-saleable merchandise item, and automatically validates a record that includes the feature value of the saleable merchandise item. That is, the store server 2 functions as the data managing apparatus for object recognition.

The store server 2 includes a dictionary management program according to the third embodiment in the ROM 22 or the RAM 23. In addition, the store server 2 forms a dictionary management buffer in the RAM 23 as a memory region that is necessary in performing processes according to the dictionary management program. The dictionary management buffer is configured by removing the similarity field from the dictionary management buffer 471 illustrated in FIG. 7. Hereinafter, the dictionary management buffer according to the third embodiment will be referred to as a second dictionary management buffer so as to be distinguished from the dictionary management buffer 471.

Figure 13:
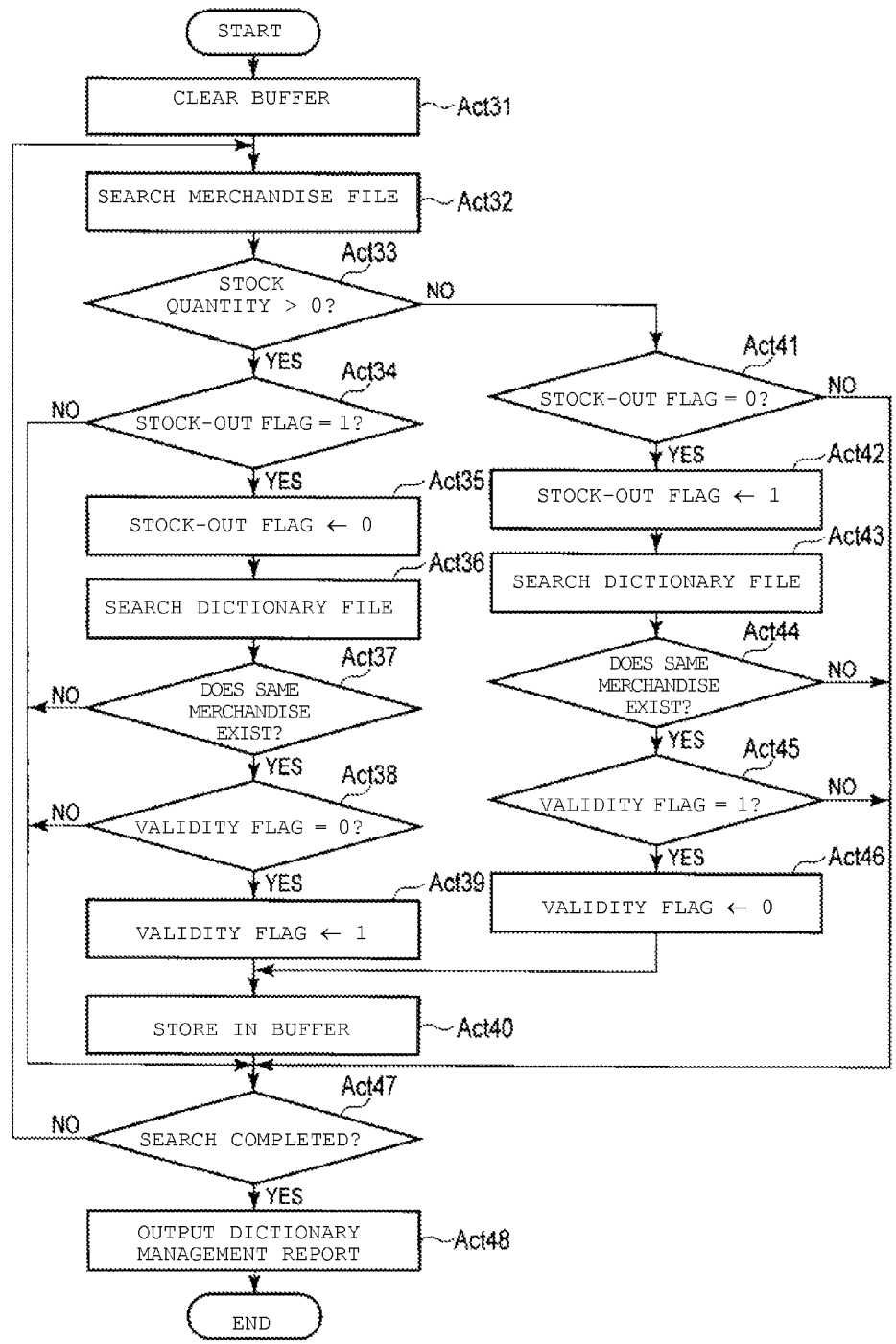
FIG. 13 is a flowchart illustrating information processing performed by a CPU of the store server according to the dictionary management program in a third embodiment.

FIG. 13 is a flowchart illustrating information processing that the CPU 21 of the store server 2 performs according to the dictionary management program. The dictionary management program is launched when, for example, the time tracked by the clock unit 26 reaches a preset start time. Hereinafter, the operation of the store server 2 will be described with reference to the flowchart. The processes illustrated in FIG. 13 and described hereinafter is for illustrative purposes only. Various processes that may achieve the same effect may be appropriately used.

The CPU 45 first clears the second dictionary management buffer when the dictionary management program is launched (Act 31). Next, the store server 2 searches the merchandise file 5 and obtains the data record (merchandise code, merchandise name, price, stock quantity, stock-out flag, and the like) 5R of one merchandise item from the merchandise file 5 (Act 32). Then, the CPU 21 determines whether the stock quantity of the record 5R is greater than "0" (Act 33).

The merchandise item that is specified by the merchandise code of the data record 5R is saleable when the stock quantity is greater than "0" (YES in Act 33). If so, the CPU 21 determines whether or not the stock-out flag of the data record 5R is set (i.e., the stock-out flag is "1") (Act 34). When the stock-out flag is not "1" (NO in Act 34), the merchandise item is not acknowledged as being out of stock in the previous determination. In this case, the process proceeds to Act 47.

The merchandise item is acknowledged as being out of stock in the previous determination when the stock-out flag is "1" (YES in Act 34). In this case, the CPU 21 sets the stock-out flag as "0" (Act 35).

The CPU 21 searches the dictionary file 6 for the merchandise code of the merchandise item (Act 36). Then, the CPU 21 determines whether the dictionary file 6 includes the data record 6R that includes the merchandise code of the merchandise item (Act 37). When the dictionary file 6 does not includes the data record 6R that includes the merchandise code of the merchandise item (NO in Act 37), the merchandise item is not a target of object recognition by the merchandise reading apparatus 4. In this case, the process proceeds to Act 47.

The merchandise item is a target of object recognition by the merchandise reading apparatus 4 when the dictionary file 6 includes the data record 6R that includes the merchandise code of the merchandise item (YES in Act 37). The CPU 21 determines whether or not the validity flag of the record 6R is set (i.e., the validity flag is "0") (Act 38). When the validity flag is "1" (NO in Act 38), the record 6R that includes the feature value of the merchandise item has been already validated. In this case, the process proceeds to Act 47.

The CPU 21 (validating section) sets the validity flag of the record 6R as "1" (Act 39) when the validity flag is set as "0" (YES in Act 38). The CPU 21 writes the merchandise code, the merchandise name, and the validity flag of the record 6R in the second dictionary management buffer (Act 40). Thereafter, the process proceeds to Act 47.

Meanwhile, the merchandise item that is specified by the merchandise code of the data record 5R is non-saleable when the stock quantity is "0" in Act 33 (NO in Act 33). If so, the CPU 21 determines whether or not the stock-out flag of the data record 5R is set (i.e., the stock-out flag is "0") (Act 41). When the stock-out flag is "1" (NO in Act 41), the merchandise item is acknowledged as being out of stock in the previous determination. In this case, the process proceeds to Act 47.

The merchandise item is acknowledged as not being out of stock in the previous determination when the stock-out flag is "0" (YES in Act 41). In this case, the CPU 21 sets the stock-out flag as "1" (Act 42).

The CPU 21 searches the dictionary file 6 for the merchandise code of the merchandise item (Act 43). The CPU 21 determines whether the dictionary file 6 includes the data record 6R that includes the merchandise code of the merchandise item (Act 44). When the dictionary file 6 does not include the data record 6R that includes the merchandise code of the merchandise item (NO in Act 44), the merchandise item is not a target of object recognition by the merchandise reading apparatus 4. In this case, the process proceeds to Act 47.

The merchandise item is a target of object recognition by the merchandise reading apparatus 4 when the dictionary file 6 includes the data record 6R that includes the merchandise code of the merchandise item (YES in Act 44). If so, the CPU 21 determines whether or not the validity flag of the record 6R is set (i.e., the validity flag is "1") (Act 45). When the validity flag is "0" (NO in Act 45), the record 6R that includes the feature value of the merchandise item has been already invalidated. In this case, the process proceeds to Act 47.

The CPU 21 (invalidating section) sets the validity flag of the record 6R as "0" (Act 46) when the validity flag is set as "1" (YES in Act 45). The CPU 21 writes the merchandise code, the merchandise name, and the validity flag of the record 6R in the second dictionary management buffer (Act 40). Thereafter, the process proceeds to Act 47.

The CPU 21 determines whether the search in the merchandise file 5 is completed (Act 47). The process returns to Act 32 when the data record 5R that is obtained from the merchandise file 5 is not the last record of the merchandise file 5, and the search is determined to be not completed (NO in Act 47).

That is, the CPU 21 sequentially obtains the data record 5R from the merchandise file 5. Each time the CPU 21 obtains the data record 5R, the CPU 21 checks the stock quantity of the data record 5R. For a merchandise item having a stock quantity greater than "0" and a stock-out flag of "1", the CPU 21 sets the stock-out flag as "0" and checks whether the data record 6R of the merchandise item is included in the dictionary file 6. When the data record 6R of the merchandise item is included, the CPU 21 sets the validity flag included in the data record 6R of the merchandise item as "1". That is, the CPU 21 validates the data record 6R of the merchandise item.

For a merchandise item having a stock quantity of "0" and a stock-out flag of "0", the CPU 21 sets the stock-out flag as "1" and determines whether the data record 6R of the merchandise item is included in the dictionary file 6. When the data record 6R of the merchandise item is included, the CPU 21 sets the validity flag included in the data record 6R of the merchandise item as "0". That is, the CPU 21 invalidates the data record 6R of the merchandise item. The CPU 21 accumulates the merchandise code, the merchandise name, and the rewritten validity flag of the data record 6R of which the validity flag is rewritten in the second dictionary management buffer.

The CPU 21, when the search in the merchandise file 5 is completed (YES in Act 47), generates a dictionary management report 9 (refer to FIG. 14) based on the data accumulated in the second dictionary management buffer. The CPU 21 (notifying section) transmits print data of the dictionary management report 9 to, for example, a printer server (not illustrated) that is connected to the store server 2 through the network 3 and causes the dictionary management report 9 to be printed.

Figure 14:
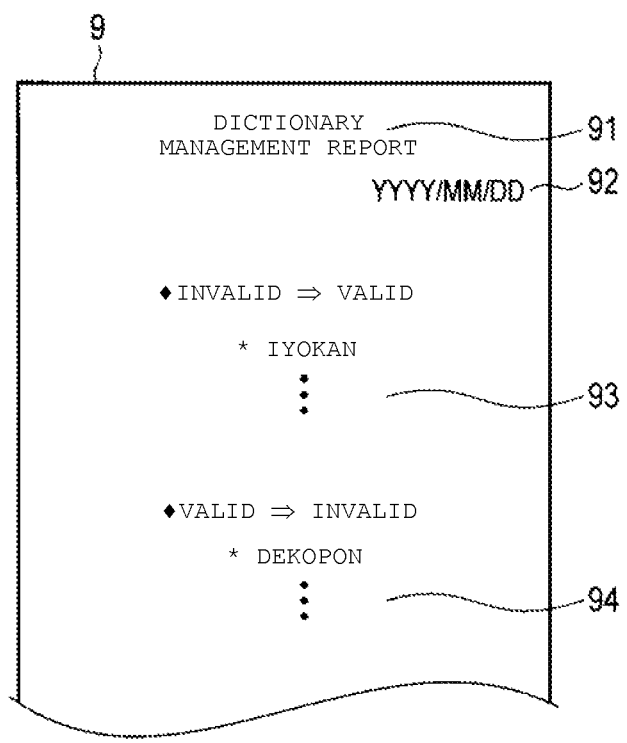
FIG. 14 illustrates an example of a dictionary management report that is printed in the third embodiment.

FIG. 14 is an example of the dictionary management report 9 printed on a sheet. As illustrated in FIG. 14, a title 91, a date 92, a merchandise name group 93 for merchandise items having a validity flag changed from an invalid state of "0" to a valid state of "1", and a merchandise name group 94 for merchandise items having a validity flag changed from a valid state of "1" to an invalid state of "0" are printed in the dictionary management report 9. Accordingly, from the information of the dictionary management report 9, the operator may recognize the merchandise item having the invalidated data record 6R in the dictionary file 6 due to being out of stock and the merchandise item having the validated data record 6R in the dictionary file 6 due to restocking, on the date specified by the date 92.

According to the third embodiment, since the data record 6R of the dictionary file 6 that is related to a merchandise item which has a stock quantity of "0" and is out of stock may be automatically invalidated, the recognition performance of the merchandise reading apparatus 4 may be increased without burdening the operator.

The invention is not limited to the above embodiments.

For example, while a merchandise item detected based on a captured image is specified as a recognition target merchandise item in the above embodiments, the specifying section is not limited to this. For example, when feature value is newly added to the dictionary file 6, a recognition target merchandise item may be specified by inputting the merchandise code of a merchandise item that has the added feature value. In this case, the data managing apparatus for object recognition may store one of the newly added feature value in the work memory of the RAM 47 as the exterior features of the merchandise item and may perform the processes from Act 6.

The data managing apparatus for object recognition is generally provided with the programs such as the dictionary management program stored on the ROM. However, the transfer method is not limited to this. The dictionary management program and the like may be separately provided from a computer apparatus and may be written into a writable memory device that is provided in the computer apparatus through an operation by a user or the like. The dictionary management program and the like may be provided by being recorded on a removable recording medium or by communication through a network. The form of the recording medium is not limited provided that the recording medium may store programs like a CD-ROM and a memory card and may be read by the apparatus. The apparatus may achieve functions that are obtained by installing or downloading programs in cooperation with an operating system (OS) and the like inside the apparatus.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for updating product data used for object recognition and carrying out object recognition using the updated data, comprising:
   maintaining, for each of products registered for sale, image data, inventory data, and a valid flag indicating validity of the product for the object recognition, in a storage device;
   with respect to each product selected among the registered products, carrying out an update operation including:
      determining whether or not the selected product is in inventory based on the inventory data of the selected product;
      when the selected product is determined to be in inventory, setting the valid flag if the valid flag is not set, and maintaining the valid flag if the valid flag is set; and
      when the selected product is determined to be not in inventory, clearing the valid flag if the valid flag is set, and maintaining a state of the valid flag if the valid flag is not set; and
   displaying, on a display, a plurality of selectable objects each of which corresponds to one of candidate products that are selected from the registered products based on a feature value obtained from a captured image and the image data of the registered products, wherein
   a selectable object corresponding to a candidate product for which the valid flag is set is displayed differently from a selectable object corresponding to a candidate product for which the valid flag is not set.

2. The method according to claim 1, further comprising:
   maintaining, for each of products registered for sale, an out-of-stock flag indicating an inventory state of the product, wherein the update operation further includes:
      when the selected product is determined to be in inventory, clearing the out-of-stock flag if the out-of-stock flag is set, and maintaining a state of the out-of-stock flag if the out-of-stock flag is not set; and
      when the selected product is determined to be not in inventory, setting the out-of-stock flag if the out-of-stock flag is not set, and maintaining the out-of-stock flag if the stock-out flag is set.

3. The method according to claim 1, wherein
   the image data of a product registered for sale include one or more feature values representing a feature of a surface of the product.

4. The method according to claim 1, wherein
   a luminance of the selectable object corresponding to the candidate product for which the valid flag is set is different from a luminance of the selectable object corresponding to the candidate product for which the valid flag is not set.

5. The method according to claim 1, wherein
   the update is automatically carried out at a predetermined time of a day.

6. A non-transitory computer-readable medium comprising a program that is executable in a computing device of a server system to cause the computing device to perform a method of updating product data used for object recognition and carrying out object recognition using the updated data, the method comprising:
   maintaining, for each of products registered for sale, image data, inventory data, and a valid flag indicating validity of the product for the object recognition, in a storage device;
   with respect to each product selected among the registered products, carrying out an update operation including:
      determining whether or not the selected product is in inventory based on the inventory data of the selected product;
      when the selected product is determined to be in inventory, setting the valid flag if the valid flag is not set, and maintaining the valid flag if the valid flag is set; and
      when the selected product is determined to be not in inventory, clearing the valid flag if the valid flag is set, and maintaining a state of the valid flag if the valid flag is not set; and
   displaying, on a display, a plurality of selectable objects each of which corresponds to one of candidate products that are selected from the registered products based on a feature value obtained from a captured image and the image data of the registered products, wherein
   a selectable object corresponding to a candidate product for which the valid flag is set is displayed differently from a selectable object corresponding to a candidate product for which the valid flag is not set.

7. The non-transitory computer-readable medium according to claim 6, wherein the method further comprises:
   maintaining, for each of products registered for sale, an out-of-stock flag indicating an inventory state of the product, wherein the update operation further includes:
      when the selected product is determined to be in inventory, clearing the out-of-stock flag if the out-of-stock flag is set, and maintaining a state of the out-of-stock flag if the out-of-stock flag is not set; and
      when the selected product is determined to be not in inventory, setting the out-of-stock flag if the out-of-stock flag is not set, and maintaining the out-of-stock flag if the out-of-stock flag is set.

8. The non-transitory computer-readable medium according to claim 6, wherein
   the image data of a product registered for sale include one or more feature values representing a feature of a surface of the product.

9. The non-transitory computer-readable medium according to claim 6, wherein
   a luminance of the selectable object corresponding to the candidate product for which the valid flag is set is different from a luminance of the selectable object corresponding to the candidate product for which the valid flag is not set.

10. The non-transitory computer-readable medium according to claim 6, wherein
    the update is automatically carried out at a predetermined time of a day.

11. A server system comprising:
    a storage device; and
    a processor configured to carry out an operation of updating product data used for object recognition and carrying out object recognition using the updated data, which includes the steps of:

maintaining, for each of products registered for sale, image data, inventory data, and a valid flag indicating validity of the product for the object recognition, in the storage device;

with respect to each product selected among the registered products, carrying out an update operation including:
  determining whether or not the selected product is in inventory based on the inventory data of the selected product;
  when the selected product is determined to be in inventory, setting the valid flag if the valid flag is not set, and maintaining the valid flag if the valid flag is set; and
  when the selected product is determined to be not in inventory, clearing the valid flag if the valid flag is set, and maintaining a state of the valid flag if the valid flag is not set; and displaying, on a display, a plurality of selectable objects each of which corresponds to one of candidate products that are selected from the registered products based on a feature value obtained from a captured image and the image data of the registered products, wherein a selectable object corresponding to a candidate product for which the valid flag is set is displayed differently from a selectable object corresponding to a candidate product for which the valid flag is not set.

12. The server system according to claim 11, wherein the steps further comprises:
  maintaining, for each of products registered for sale, an out-of-stock flag indicating an inventory state of the product, wherein the update operation further includes:
    when the selected product is determined to be in inventory, clearing the out-of-stock flag if the out-of-stock flag is set, and maintaining a state of the out-of-stock flag if the out-of-stock flag is not set; and
    when the selected product is determined to be not in inventory, setting the out-of-stock flag if the out-of-stock flag is not set, and maintaining the out-of-stock flag if the out-of-stock flag is set.

13. The server system according to claim 11, wherein the image data of a product registered for sale include one or more feature values representing a feature of a surface of the product.

14. The server system according to claim 11, wherein a luminance of the selectable object corresponding to the candidate product for which the valid flag is set is different from a luminance of the selectable object corresponding to the candidate product for which the valid flag is not set.

15. The server system according to claim 11, wherein the processor is configured to carry out the update operation automatically at a predetermined time of a day.

* * * * *